(12) United States Patent
Kim et al.

(10) Patent No.: US 9,268,767 B2
(45) Date of Patent: Feb. 23, 2016

(54) SEMANTIC-BASED SEARCH SYSTEM AND SEARCH METHOD THEREOF

(71) Applicant: Electronics and Telecommunications Research Institute, Daejeon (KR)

(72) Inventors: Hyung Woo Kim, Seongnam (KR); Joon Myun Cho, Daejeon (KR); Moo Hun Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 171 days.

(21) Appl. No.: 13/975,002

(22) Filed: Aug. 23, 2013

(65) Prior Publication Data

US 2014/0258322 A1  Sep. 11, 2014

(30) Foreign Application Priority Data

Mar. 6, 2013  (KR) ........................ 10-2013-0024090

(51) Int. Cl.
*G06F 17/30* (2006.01)
*G06F 17/27* (2006.01)

(52) U.S. Cl.
CPC ...... *G06F 17/2785* (2013.01); *G06F 17/30684* (2013.01); *G06F 17/30699* (2013.01)

(58) Field of Classification Search
USPC ................................................ 707/706–765
See application file for complete search history.

(56) References Cited

U.S. PATENT DOCUMENTS

| 6,990,628 | B1* | 1/2006 | Palmer | G06F 17/2211 707/999.003 |
| 7,779,009 | B2 | 8/2010 | Chowdhury et al. | |
| 8,019,748 | B1 | 9/2011 | Wu et al. | |
| 8,249,876 | B1* | 8/2012 | Ainslie | 704/270 |
| 2004/0139067 | A1* | 7/2004 | Houle | G06F 17/30705 |
| 2005/0144162 | A1* | 6/2005 | Liang | 707/3 |
| 2005/0154723 | A1* | 7/2005 | Liang | 707/3 |
| 2005/0160107 | A1* | 7/2005 | Liang | 707/100 |

(Continued)

FOREIGN PATENT DOCUMENTS

| KR | 10-2009-0072680 A | 7/2009 |
| KR | 10-2012-0053253 A | 5/2012 |

OTHER PUBLICATIONS

Yuangui Lei et al., "SemSearch: A Search Engine for the Semantic Web", EKAW, 2006, pp. 238-245, Knowledge Media Institute (KMi), The Open University, Milton Keynes, United Kingdom.

(Continued)

*Primary Examiner* — Hanh Thai

(57) ABSTRACT

A semantic-based search system includes a log generating unit configured to generate a common log storing knowledge corresponding to general knowledge and a user log stored by reflecting user preference, an instance analyzing unit configured to analyze vector characteristics corresponding to an instance among interpretation alternatives according to a keyword input by a user, a weighted value calculating unit configured to calculate weighted values of confidence values and cosine similarity values of interpretation alternatives including vector characteristics of the instance with respect to at least an one of the common log and the user log, and an aligning unit configured to align rankings of the interpretation alternatives according to the keyword input on the basis of the calculated weight values of the confidence values and the cosine similarity values.

14 Claims, 8 Drawing Sheets

(56) References Cited

U.S. PATENT DOCUMENTS

| | | | |
|---|---|---|---|
| 2006/0155673 A1* | 7/2006 | Houck | G06F 17/30654 |
| 2007/0136251 A1* | 6/2007 | Colledge | G06F 17/3064 |
| 2007/0168366 A1* | 7/2007 | Fux et al. | 707/100 |
| 2008/0063276 A1* | 3/2008 | Vincent et al. | 382/182 |
| 2008/0195601 A1* | 8/2008 | Ntoulas | G06F 17/30622 |
| 2010/0306249 A1* | 12/2010 | Hill | G06F 17/30867 707/769 |
| 2011/0022550 A1* | 1/2011 | Pennacchiotti | G06N 99/005 706/12 |
| 2011/0022598 A1* | 1/2011 | Pennacchiotti | G06F 17/30864 707/739 |
| 2011/0153309 A1* | 6/2011 | Kim | G06F 17/2854 704/2 |
| 2012/0066214 A1* | 3/2012 | Nelke et al. | 707/723 |
| 2012/0278297 A1* | 11/2012 | Yin et al. | 707/706 |
| 2013/0138586 A1* | 5/2013 | Jung | G06N 99/005 706/12 |
| 2013/0185314 A1* | 7/2013 | Rubinstein et al. | 707/749 |
| 2013/0226846 A1* | 8/2013 | Li | G06N 5/02 706/12 |
| 2014/0163959 A1* | 6/2014 | Hebert | G06F 17/2785 704/9 |
| 2014/0244560 A1* | 8/2014 | Mohanty et al. | 706/46 |
| 2014/0244621 A1* | 8/2014 | Lindsay | 707/722 |

OTHER PUBLICATIONS

Thanh Tran et al., "Ontology-based Interpretation of Keywords for Semantic Search", ISWC/ASWC, 2007, pp. 523-536, Institute AIFB, Universitat Karlsruhe, Germany.

* cited by examiner

FIG. 2

- Confidence
  $X \rightarrow Y$, Confidence = $n(X \cup Y)/n(X)$
  Log : movie director[0.8]-actor[0.2]-directing[1]-movie[1], movie director[0.1]-actor[0.9]-appearance[1]-movie[1]
  Q1:actor[1]-directing[1]-movie[1], Q2:actor[1]-appearance[1]-movie[1]
  Conf. of Q1 = 1, Conf. of Q2 = 1,    Conf. of Q1 = Conf. of Q2

FIG. 3

- Modified Confidence
  X→Y, Modified Confidence = [∑{(X∪Y) · L}/|X∪Y|] / [∑{(X) · L}/|X|]
  Log : movie director[0.8]-actor[0.2]-directing[1]-movie[1], movie director[0.1]-actor[0.9]-appearance[1]-movie[1]
  Q1:actor[1]-directing[1]-movie[1], Q2:actor[1]-appearance[1]-movie[1]
  Conf. of Q1 = (0.2+1+1)/3, Conf. of Q2 = (0.9+1+1)/3,   Conf. of Q1 < Conf. of Q2

FIG. 4

- Cosine Similarity
  $COS(A, B) = A \cdot B / (|A| \times |B|)$
  similarity is obtained based on distance between two vectors

FIG. 5

|  | Conf. | Cos. |
|---|---|---|
| Common Log | Precision : ◎<br>Recall : △ | Precision : X<br>Recall : X |
| User Log | Precision : ○<br>Recall : ○ | Precision : △<br>Recall : ◎ |

SEMANTIC-BASED SEARCH SYSTEM AND SEARCH METHOD THEREOF

CROSS-REFERENCE TO RELATED APPLICATIONS

This application claims the benefit of priority of Korean Patent Application No. 10-2013-0024090 filed on Mar. 6, 2013, all of which are incorporated by reference in their entirety herein.

BACKGROUND OF THE INVENTION

1. Field of the Invention

The present invention relates to a semantic-based search system and a search method thereof and, more particularly, to a semantic-based search system providing an interpretation alternative of a keyword according to a keyword input, and a search method thereof.

2. Related Art

In an existing search method of a Web searching engine, when a user inputs a keyword desired to be searched, a search statement denoting a keyword conforming to a keyword within content of the search statement (or content) or meta-data added to a search sentence is searched. Thus, since a search sentence identical to a keyword is searched according to an input of a keyword, there is no need to interpret a meaning of a search sentence expressed by a relationship between keywords.

However, an existing keyword conformity-based search method has confronted with a limitation according to simple searching, so a semantic-based search scheme has been studied. Here, the semantic-based searching scheme is a searching scheme of interpreting a meaning of a search sentence on the basis of relationships between and among entities denoted by input keywords, and searching data conforming to the interpretation.

Also, terminal devices with which users execute search application extend to terminal devices having restrictions to a sentence input interface, such as a smart phone, a tablet personal computer (PC), a smart TV, and the like, in addition to a PC. In a terminal environment of these terminal devices, a search sentence is input through a Qwerty keyboard, or the like, displayed on a small screen because they do not have a dedicated keyword for inputting a keyword. In case of recent enlarged terminal devices, a keyword is input through a Qwerty keyboard, or the like, displayed on a small screen, only a key word (or a necessary word), while omitting a verb, or the like, rather than inputting a complete natural language sentence, is input in order to minimize the number of times of inputting a keyboard. Thus, input of only a key word according to the input scheme in the limited input environment makes it difficult to interpret a meaning thereof because there is no information regarding a sentence structure.

Meanwhile, Korean Patent Laid Open Publication No. 10-2012-0053253 entitled "Hybrid semantic search system and method" discloses a semantic-based search system using a semantic-based searching scheme.

The related art "Hybrid semantic search system and method" includes determining a type of a query received from a user terminal, performing keyword searching on a query when the query input by a user is a free query; determining whether to perform semantic-based searching on the query on the basis of keyword search results with respect to the query and performing semantic-based searching using ontology on the query, and providing results of the performed semantic-based searching to the user terminal.

However, in the case of the related art "Hybrid semantic search system and method", the number of keywords input by a user is fixed and a partial graph conforming to a combination of types of knowledge base entities to which each keyword is mapped, e.g., a combination of an instance, properties, and a number of classes, is searched from a knowledge base, having a problem in that interpretation alternatives of a keyword a user wants to substantially search cannot be accurately derived.

RELATED ART

Patent Document

Korean Patent Laid Open Publication No. 10-2012-0053253 entitled "Hybrid semantic search system and method"

SUMMARY OF THE INVENTION

The present invention provides a semantic-based search system capable of ranking interpretation alternatives in consideration of user preference when a plurality of interpretation alternatives are searched according to a keyword input by a user, thus enhancing precision of searching, and a search method thereof.

In an aspect, a semantic-based search system includes: a log generating unit configured to generate a common log storing knowledge corresponding to general knowledge and a user log stored by reflecting user preference; an instance analyzing unit configured to analyze vector characteristics corresponding to an instance among interpretation alternatives according to a keyword input by a user; a weighted value calculating unit configured to calculate weighted values of confidence values and cosine similarity values of interpretation alternatives including vector characteristics of the instance with respect to at least an one of the common log and the user log; and an aligning unit configured to align rankings of the interpretation alternatives according to the keyword input on the basis of the calculated weight values of the confidence values and the cosine similarity values.

The confidence values may include confidence values between the common log and the interpretation alternatives and confidence values between the user log and the interpretation alternatives.

The cosine similarity values may include cosine similarity values between the user log and the interpretation alternatives.

The weighted value calculating unit may sequentially calculate weight values of the confidence values between the common log and the interpretation alternatives, weight values of the confidence values between the user log and the interpretation alternatives, and weight values of the cosine similarity values between the user log and the interpretation alternatives.

The semantic-based search system may further include: a database (DB) unit configured to store knowledge corresponding to general knowledge stored in the common log.

When the common log has a plurality of interpretation alternatives, calculated weight values of the confidence values between the common log and the interpretation alternatives may not be reflected.

The user log may include search records which were searched by the user.

In another aspect, a search method of a semantic-based search system includes: (a) generating a user log storing information searched by a user by reflecting user preference; (b) generating a common log storing knowledge corresponding to general knowledge when the user inputs a keyword; (c) analyzing vector characteristics corresponding to an instance among interpretation alternatives according to the keyword input; (d) calculating weighted values of confidence values and cosine similarity values of interpretation alternatives including the vector characteristics of the instance with respect to at least any one of the common log and the user log; and (e) aligning rankings of the interpretation alternatives according to the keyword input on the basis of the calculated weighted values of the confidence values and the cosine similarity values.

The confidence values may include confidence values between the common log and the interpretation alternatives and confidence values between the user log and the interpretation alternatives.

The cosine similarity values may include cosine similarity values between the user log and the interpretation alternatives.

In operation (d), weight values of the confidence values between the common log and the interpretation alternatives, weight values of the confidence values between the user log and the interpretation alternatives, and weight values of the cosine similarity values between the user log and the interpretation alternatives may be sequentially calculated.

In operation (d), when there are a plurality of interpretation alternatives according to the keyword input in operation (c), the weighted values of the confidence values between the user log and the interpretation alternatives and the weighted values of the cosine similarity values between the user log and the interpretation alternatives may be sequentially calculated.

Operation (a) may include: inputting a particular search word by a user; and analyzing characteristics of an instance included in interpretation results according to the input of the particular search word and storing the particular search word input by the user including the analyzed content in the user log.

In operation (b), the semantic-based search system may include a database (DB) unit storing knowledge corresponding to general knowledge, wherein when the user inputs the keyword, information corresponding to the keyword may be extracted from the DB unit and stored in the common log.

Other details of embodiments are included in the detailed description and drawings.

The semantic-based search system and the search method thereof according to embodiments of the present invention have the following advantages.

First, since interpretation alternatives according to user keyword search based on calculation of weighted values of confidence values and cosine similarity values are aligned as rankings in consideration of user preference, user search satisfaction can be enhanced.

Second, when there is no search history in the past, a user can search interpretation alternatives by using a common log including general knowledge.

BRIEF DESCRIPTION OF THE DRAWINGS

FIGS. 2 and 3 are views illustrating algorithms for calculating confidence values of interpretation alternatives by a weighted value calculation unit illustrated in FIG. 1;

FIGS. 4 and 5 are views illustrating an algorithm for calculating a cosine similarity value of interpretation alternatives by the weighted value calculation unit illustrated in FIG. 1 and a table showing accuracy of confidence values and cosine similarity values of a common long and a user log;

DESCRIPTION OF EXEMPLARY EMBODIMENTS

Hereinafter, a semantic-based search system and a search method thereof according to an embodiment of the present invention will be described in detail with reference to the accompanying drawings.

To begin with, it should be appreciated that an interpretation alternative described hereinafter is a search object (or a search stuff) searched when a user inputs a keyword associated with a search sentence (or contents) desired to be searched.

Figure 1:
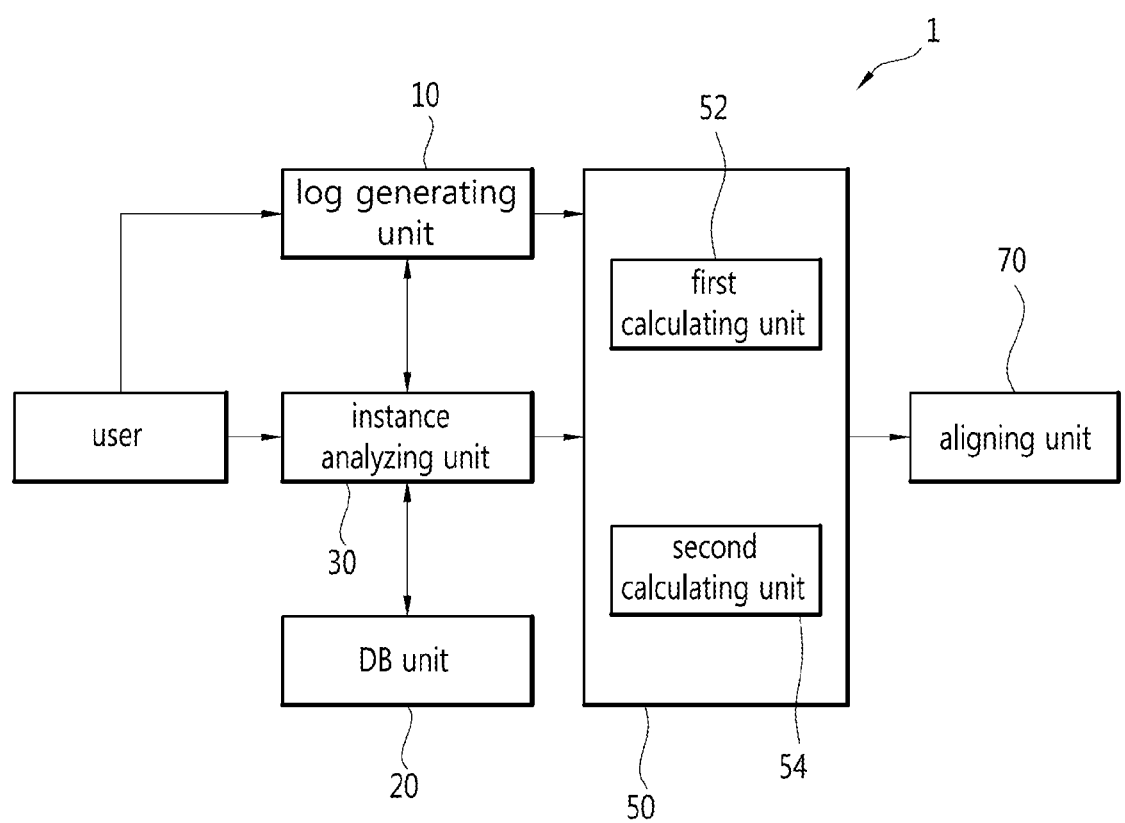
FIG. 1 is a control block diagram of a semantic-based search system according to an embodiment of the present invention.

FIG. 1 is a control block diagram of a semantic-based search system according to an embodiment of the present invention.

As illustrated in FIG. 1, a semantic-based search system 1 according to an embodiment of the present invention includes a log generating unit 10, a database (DB) unit 20, an instant analyzing unit 30, a weighted value calculating unit 50, and an aligning unit 70.

The log generating unit 10 generates a common log storing knowledge corresponding to general knowledge and a user log storing information by reflecting user preference. The log generating unit 10 generates the common log by using knowledge information stored in the DB unit 20 when a user inputs a keyword, and generates the user log by using information used by the user in the past.

The DB unit 20 stores knowledge corresponding to general knowledge stored in the common log. The DB unit 20, when extended, may be considered as a server providing information in the Internet. The knowledge information stored in the DB unit 20 may be used for analyzing an instance according to a keyword input by a user.

The instance analyzing unit 30 analyzes vector characteristics corresponding to an instance (which refers to each entity belonging to a certain class in object-oriented programming) among interpretation alternatives according to the keyword input by the user. The vector characteristics analyzed by the instance analyzing unit 30 may have various weighted values according to instance information stored in the DB unit 20.

For example, as for instance vector characteristics, when a character 'A' is input, vector characteristics of an instance regarding 'A' is analyzed. In detail, when seven movies directed by 'A', two movies in which 'A' plays, and one movie produced by 'A' are searched, the vector characteristics of the instance are {[actor 0.2], [movie director 0.7], [producer 0.1]}. Meanwhile, when a character 'B' is input, if three movies in which 'B' plays are searched, the vector characteristics of the instance are {[actor 1]}.

Meanwhile, substantially, the foregoing common log and the user log are formed through instance analysis. In case of the common log, when general knowledge such as "{actor 1} {appearance} {movie}" and "{actor 1} {directing} {movie}" is included, a movie in which the character 'B' plays when the character 'B' is input may be the most preferred interpretation alternative. However, in a case in which vector characteristics of an instance are "{actor 0.5}, {actor 0.5}, {directing}, {movie}", an interpretation alternative such as "a movie directed by an instance as a movie director and actor" may vary according to user preference, so it is not specified in the common log.

The user log, which stores keywords that a corresponding user used in the past, is used to reflect user preference. For example, as for the user log, when the user inputs past "movie directed by C" as a keyword, "{movie director 0.5} {movie director 0.5} {directing} {movie}" may be stored through an instance analysis process by the instance analyzing unit. Thereafter, when the user inputs an instance denoting the characteristics of 'D' similar to 'C', as a keyword, {directing} existing in the past user log is used to have a weighted value higher than those of properties (characteristics0 such as {appearance} or {producing}.

FIGS. 2 and 3 are views illustrating algorithms for calculating confidence values of interpretation alternatives by a weighted value calculation unit illustrated in FIG. 1. FIGS. 4 and 5 are views illustrating an algorithm for calculating a cosine similarity value of interpretation alternatives by the weighted value calculation unit illustrated in FIG. 1 and a table showing accuracy of confidence values and cosine similarity values of a common long and a user log.

As illustrated in FIGS. 2 through 5, the weighted value calculating unit 50 calculates weighted values of confidence values and cosine similarity values of interpretation alternatives including vector characteristics of an instance with respect to at least any one of a common log and a user log. In an embodiment of the present invention, the weighted value calculating unit 50 includes a first calculating unit 52 configured to calculate a weight value of a confidence value and a second calculating unit 54 configured to calculate a weighted value of a cosine similarity value.

In order to calculate a weighted value of an interpretation alternative with respect to a common log and a user log, the weight value calculating unit 50 may use existing data-mining or various calculation methods used in an information search field. In an embodiment of the present invention, the weighted value calculating unit 50 calculates weight values of interpretation alternatives by using a confidence value and a cosine similarity value.

Here, a confidence value calculated according to an existing association rule mining scheme is illustrated in FIG. 2.

For example, two user logs are generated according to a keyword input by a user. Here, a confidence value of an interpretation alternative according to the user's keyword input is calculated to be the same. Thus, since the confidence value is calculated to be the same, user preference is not reflected. Namely, since weighted values (e.g., movie director 0.8 and actor 0.2, and movie director 0.1 and actor 0.9) obtained by analyzing vector characteristics of instances are not reflected, user preference is not reflected.

In comparison, as for calculation of modified confidence value, weighted values obtained by analyzing vector characteristics of instances and the instances according to the keyword input are multiplied, respectively, and the respective multiplied values are added, and the added value is divided by the number of multiplication to calculate confidence. In this manner, according to the calculation scheme of a modified confidence value, the size values of the confidence values can be relatively compared, and thus, rankings of the interpretation alternatives according to user preference can be aligned.

However, in the case of the calculation scheme according to a modified confidence value, a confidence value can be calculated when the respective elements are all included. Thus, it has high precision, but if even a single element does not exist in the user log, a value cannot be calculated, having a relatively low recall value.

Thus, the weighted value calculating unit 50 calculates a cosine similarity value illustrated in FIG. 4. As for a weight value of an interpretation alternative obtained by cosine similarity, there is no need to all the elements between two vectors are not required to be the same, so weighted values of all the interpretation alternatives can be calculated, having a relatively high recall value. Also, since the size of a vector is considered, as a length of an interpretation alternative is increased, a weighted value thereof is decreased.

FIG. 5 shows a table of characteristics obtained in calculating weighted values by applying a confidence value between a common log and an interpretation alternative and a confidence value between a user log and the interpretation alternative and a cosine similarity value. In terms of the characteristics of the common log, the weighted value of the interpretation alternative obtained by the cosine similarity value has characteristics that both precision and recall are lowered, so calculating a weighted value is determined to be inappropriate. Thus, the weighted value calculating unit 50 according to an embodiment of the present invention calculates only a cosine similarity value between the user log and the interpretation alternative, as a weighted value.

The aligning unit 70 aligns rankings of the interpretation alternatives according to the user's keyword input on the basis of the calculation of the weight values of the confidence value and the cosine similarity value. In detail, the aligning unit 70 calculates weighted values of the confidence value and the cosine similarity value in consideration of user preference and aligns rankings of the interpretation alternatives. Namely, the aligning unit 70 aligns rankings of the interpretation alternatives on the basis of the confidence values between the common log and the interpretation alternatives, the confidence values between the user log and the interpretation alternatives, and the cosine similarity values between the user log and the interpretation alternatives calculated by the weighted value calculating unit 50.

Figure 6:
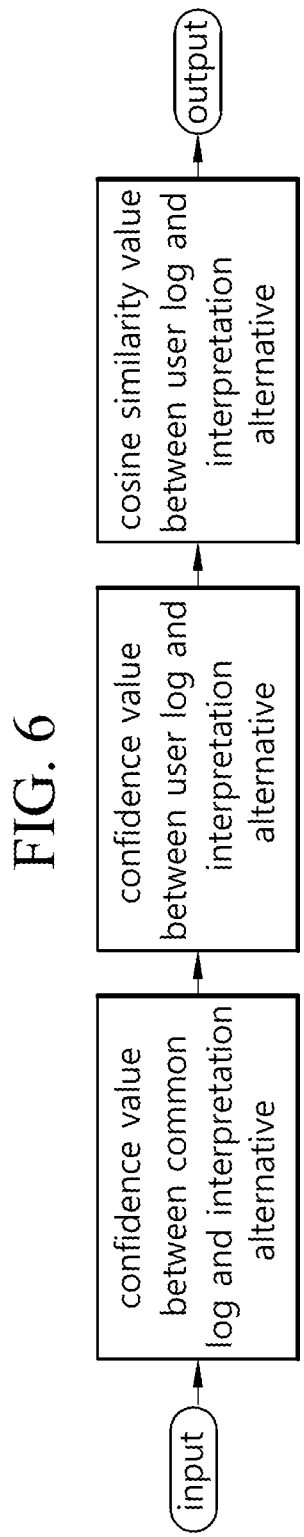
FIG. 6 is a flow chart illustrating a process of a search method of a semantic-based search system according to an embodiment of the present invention.
Figure 7:
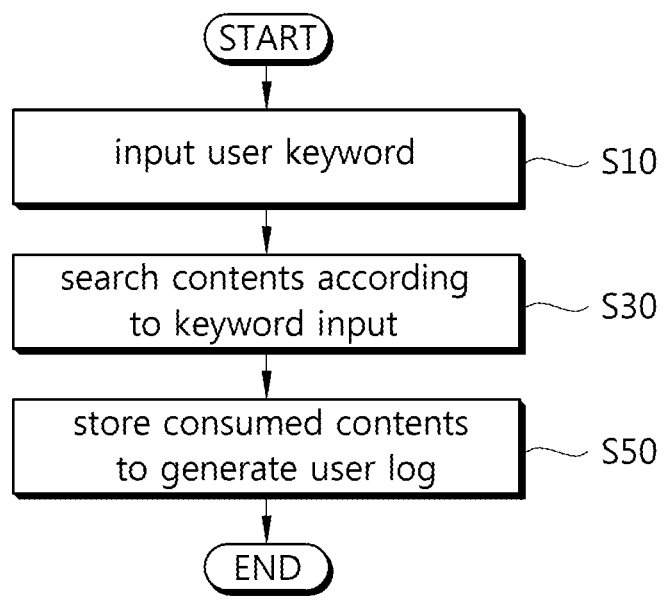
FIG. 7 is a flow chart illustrating a user log in the search method of a semantic-based search system according to an embodiment of the present invention.
Figure 8:
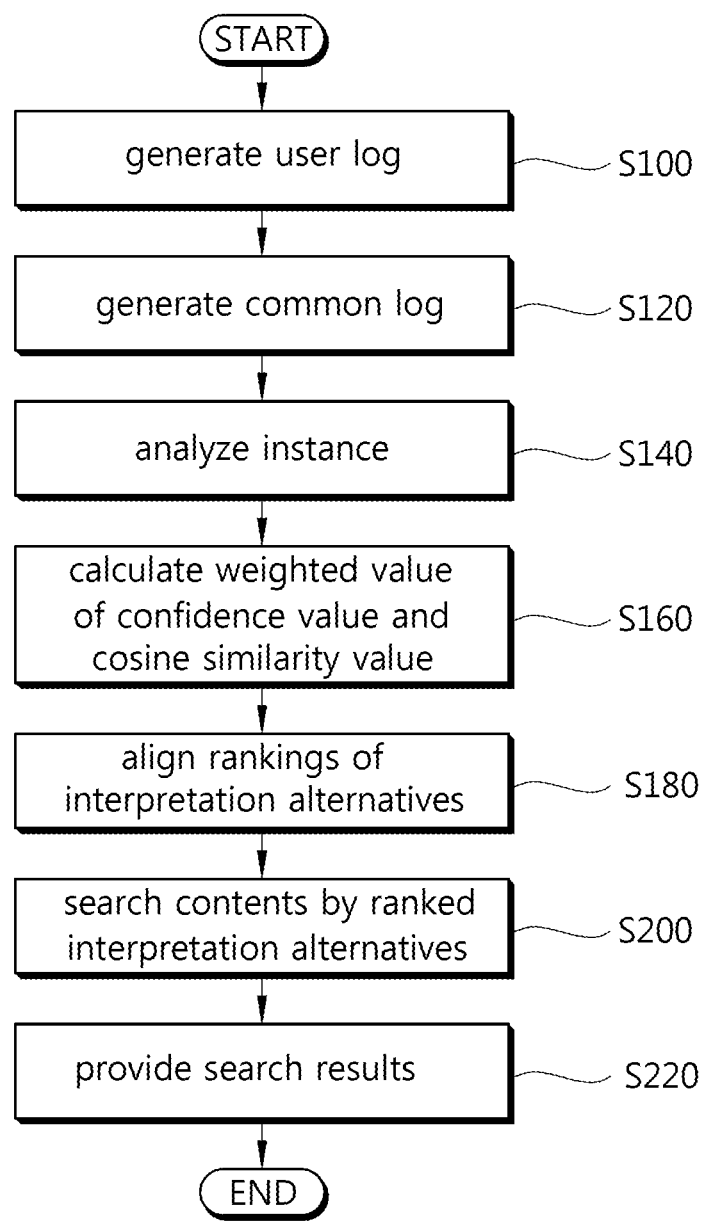
FIG. 8 is a flow chart illustrating a search method of a semantic-based search system according to an embodiment of the present invention.

FIG. 6 is a flow chart illustrating a process of a search method of a semantic-based search system according to an embodiment of the present invention. FIG. 7 is a flow chart illustrating a user log in the search method of a semantic-based search system according to an embodiment of the present invention. FIG. 8 is a flow chart illustrating a search method of a semantic-based search system according to an embodiment of the present invention.

As illustrated in FIGS. 6 through 8, a search method of the semantic-based search system 1 according to an embodiment of the present invention is as follows.

As illustrated in FIG. 6, when keywords are input by a user, the semantic-based search system 1 sequentially calculates confidence values between the common log and interpretation alternatives, confidence values between the user log and the interpretation alternatives, and cosine similarity values between the user log and the interpretation alternatives and aligns rankings of the interpretation alternatives.

Meanwhile, as illustrated in FIG. 7, the user log used to align rankings of user preference is as follows.

First, a user log is generated through a keyword input by the user in the past.

The user inputs a keyword desired to be searched (S10). When the user inputs a keyword, the contents according to the keyword input are searched (S30). Here, when the keyword is input, vector characteristics of an instance are analyzed to search contents. Contents consumed by the user are stored to generate a user log so that rankings of interpretation alternatives according to user preference can be aligned (S50).

Hereinafter, the search method of the semantic-based search system 1 according to an embodiment of the present invention will be described with reference to FIG. 8.

First, the operations (S10 to S50) of generating a user log as illustrated in FIG. 7 are performed to generate a user log (S100). A common log is generated according to a user' keyword input (S120). Here, the common log may not be used according to vector characteristics of an instance.

Vector characteristics of the instance is analyzed by analyzing the instance (S140). Weight values with respect to confidence values and cosine similarity values of interpretation alternatives including the vector characteristics of the instance are calculated with respect to at least any one of the common log and the user log (S160). Here, weighted values of the confidence values between the common log and the interpretation alternatives, weight values of the confidence values between the user log and the interpretation alternatives, and weighted values of the cosine similarity values between the user log and the interpretation alternatives are sequentially calculated. The interpretation alternatives are searched on the basis of the confidence values between the common log and the interpretation alternatives, the confidence values between the user log and the interpretation alternatives, and the cosine similarity values between the user log and the interpretation alternatives are aligned according to rankings reflecting user preference (S180).

Contents are searched with the interpretation alternatives aligned according to rankings thereof in step S180 (S200). Finally, search results are provided to the user (S220).

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

What is claimed is:

1. A semantic-based search system comprising:
a processor configured to:
generate a common log storing knowledge corresponding to general knowledge and a user log stored by reflecting user preference;
analyze vector characteristics corresponding to an instance among interpretation alternatives according to a keyword input by a user;
calculate weighted values of confidence values and cosine similarity values of interpretation alternatives including vector characteristics of the instance with respect to at least one of the common log and the user log; and
align rankings of the interpretation alternatives according to the keyword input on the basis of the calculated weight values of the confidence values and the cosine similarity values.

2. The semantic-based search system of claim 1, wherein the confidence values include confidence values between the common log and the interpretation alternatives and confidence values between the user log and the interpretation alternatives.

3. The semantic-based search system of claim 2, wherein the cosine similarity values include cosine similarity values between the user log and the interpretation alternatives.

4. The semantic-based search system of claim 3, wherein weight values of the confidence values between the common log and the interpretation alternatives, weight values of the confidence values between the user log and the interpretation alternatives, and weight values of the cosine similarity values between the user log and the interpretation alternatives are sequentially calculated.

5. The semantic-based search system of claim 1, further comprising:
a memory including a database (DB) unit to store knowledge corresponding to general knowledge stored in the common log.

6. The semantic-based search system of claim 4, wherein when the common log has a plurality of interpretation alternatives, calculated weight values of the confidence values between the common log and the interpretation alternatives are not reflected.

7. The semantic-based search system of claim 1, wherein the user log includes search records which were searched by the user.

8. A computer-implemented search method of a semantic-based search system, the method comprising:
(a) generating, using a processor, a user log storing information searched by a user by reflecting user preference;
(b) generating, using a processor, a common log storing knowledge corresponding to general knowledge when the user inputs a keyword;
(c) analyzing, using a processor, vector characteristics corresponding to an instance among interpretation alternatives according to the keyword input;
(d) calculating, using a processor, weighted values of confidence values and cosine similarity values of interpretation alternatives including the vector characteristics of the instance with respect to at least any one of the common log and the user log; and
(e) aligning, using a processor, rankings of the interpretation alternatives according to the keyword input on the basis of the calculated weighted values of the confidence values and the cosine similarity values.

9. The search method of claim 8, wherein the confidence values include confidence values between the common log and the interpretation alternatives and confidence values between the user log and the interpretation alternatives.

10. The search method of claim 9, wherein the cosine similarity values include cosine similarity values between the user log and the interpretation alternatives.

11. The search method of claim 10, wherein in operation (d), weight values of the confidence values between the common log and the interpretation alternatives, weight values of the confidence values between the user log and the interpretation alternatives, and weight values of the cosine similarity values between the user log and the interpretation alternatives are sequentially calculated.

12. The search method of claim 10, wherein in operation (d), when there are a plurality of interpretation alternatives according to the keyword input in operation (c), the weighted values of the confidence values between the user log and the interpretation alternatives and the weighted values of the cosine similarity values between the user log and the interpretation alternatives are sequentially calculated.

13. The search method of claim 8, wherein operation (a) comprises:
receiving a particular search word input by the user; and
analyzing characteristics of an instance included in interpretation results according to the input of the particular search word and storing the particular search word input by the user including the analyzed content in the user log.

14. The search method of claim 8, wherein in operation (b), the semantic-based search system comprises a database (DB) unit storing knowledge corresponding to general knowledge, wherein when the user inputs the keyword, information corresponding to the keyword is extracted from the DB unit and stored in the common log.

* * * * *